Patented May 4, 1926.

1,583,151

UNITED STATES PATENT OFFICE.

ROBERT RENTON HIND, OF DEL CARMEN, PHILIPPINE ISLANDS.

FERTILIZER AND METHOD OF MAKING SAME.

No Drawing.   Application filed August 1, 1925. Serial No. 47,633.

*To all whom it may concern:*

Be it known that I, ROBERT RENTON HIND, a citizen of the United States, residing at Del Carmen, Pampanga, Philippine Islands, have invented certain new and useful Improvements in Fertilizers and Methods of Making Same; and I do hereby declare the following to be a full, clear, and exact description of the invention, such as will enable others skilled in the art to which it appertains to make and use the same.

The invention relates to the manufacture of a new form of fertilizer which, at the same time, involves an effective mode of utilizing two products of the sugar industry which have largely been regarded as waste, the disposal of which introduced many difficulties, said products being molasses and bagasse. The present invention contemplates the conservation of the potash content in molasses, and the admixture of the potash containing materials with bagasse, which serves as a vehicle for the potash and also furnishes a humus-producing element of the fertilizer.

It is a well known fact that the molasses resulting from the manufacture of sugar cane, contains relatively large proportions of potash, and it has been proposed to render this potash available by burning the molasses. This procedure however has not proven commercially successful, because of the large losses of the potash in the process of combustion. Molasses is extensively employed in the manufacture of industrial alcohol, and it has been found that the distillery lees, which is the spent liquor from which practically all of the alcohol has been removed, contains practically all of the valuable potash content of the molasses. The lees however are acid in their re-action and kill any vegetation with which they come in contact. I have found, however, that by the addition of lime to the distillery lees, in sufficient quantity to neutralize the acidity and preferably to produce a slightly alkaline re-action of the lees, the latter may be employed as a constituent of a valuable fertilizer which contains potash in excellent form for promoting the growth of plants. However, the lees which are in liquid form, are not available commercially as a fertilizer and, in order to convert them into usable condition, they are evaporated in any suitable apparatus and, by standard methods, to a density of 47.9 degrees Baumé, or 90 degrees Brix, or a specific gravity of 1.48. The concentrated or evaporated lees are then thoroughly admixed with comminuted bagasse, which is the pithy residue of the sugar cane after all of the sugar juice has been extracted therefrom, and contains from forty to fifty percent moisture and is very absorbent. The mixing of the neutralized and concentrated lees with the comminuted bagasse may be effected in any standard type of mixing apparatus, and is carried on until the bagasse is thoroughly saturated with the lees. The resultant product is a mass of potash-charged bagasse, which contains a small amount of other plant food, such as nitrogen and phosphoric acid, all of which are valuable fertilizer constituents, the potash, nitrogen and phosphoric acid contributing directly to the heathy growth of the plants and the bagasse which, when applied to the soil, rots and adds to the humus content of the soil.

If desired superphosphate of lime and nitrogen in the form of nitrate of soda, or sulphate of ammonia, may be added to the lees-bagasse mixture to provide a complete fertilizer of varying percentages of nitrogen, phosphoric acid and potash, depending upon the particular type of fertilizer desired.

From the foregoing description it will be evident that the invention presents marked utility, in that it provides for the useful disposition of the waste bagasse and lees and the production of fertilizer rich in potash and humus-producing material, is highly stable and which may be produced at a relatively low cost.

What I claim is:

1. The method of making fertilizer, which comprises neutralizing the acid condition of molasses distillery lees, concentrating the lees by evaporation, and mixing the concentrate with bagasse.

2. The method of making fertilizer, which comprises treating the molasses distillery lees with lime, evaporating the lees to a density of approximately 90 degrees Brix, and mixing the concentrate with comminuted bagasse.

3. A fertilizer comprising bagasse saturated with neutralized and concentrated molasses distillery lees.

4. A fertilizer comprising comminuted bagasse saturated with neutralized and concentrated molasses distillery lees.

In testimony whereof I affix my signature.

ROBERT RENTON HIND.